United States Patent [19]

Myung et al.

[11] Patent Number: 5,077,735
[45] Date of Patent: Dec. 31, 1991

[54] METHOD AND AN APPARATUS FOR MUTUALLY CONVERTING DIFFERENT SIGNALING SYSTEMS

[75] Inventors: Kim J. Myung; Kim J. Guen; Youm H. Youl; Kim C. Hee, all of Daejeon, Rep. of Korea

[73] Assignees: Electronics and Telecommunications Research Institute, Daejeon; Korea Telecommunication Authority, Seoul, both of Rep. of Korea

[21] Appl. No.: 455,283

[22] Filed: Dec. 22, 1989

[30] Foreign Application Priority Data

Dec. 24, 1988 [KR] Rep. of Korea ............ 17377

[51] Int. Cl.$^5$ ............................................. H04L 5/02
[52] U.S. Cl. ................................................. 370/110.1
[58] Field of Search ............... 370/68.1, 84, 99, 110.1; 379/229; 375/4

[56] References Cited

U.S. PATENT DOCUMENTS

| | | | |
|---|---|---|---|
| 4,138,596 | 2/1979 | Roche | 370/84 |
| 4,230,911 | 10/1980 | Fellinger et al. | 370/84 |
| 4,402,079 | 8/1983 | Fellinger et al. | 370/84 |
| 4,595,907 | 6/1986 | Huffman et al. | 370/99 |
| 4,623,760 | 11/1986 | Binkerd et al. | 370/110.1 |

*Primary Examiner*—Douglas W. Olms
*Assistant Examiner*—Melvin Marcelo
*Attorney, Agent, or Firm*—Blakely, Sokoloff, Taylor & Zafman

[57] ABSTRACT

The invention provides an effective and reliable method of mutually converting different signaling systems which interconnect E1 signals and T1 signals, and by which signaling conversion functions with loop signaling or R2 signaling method can be performed and the transmission devices of various signaling systems can be interconnected.

And also the invention provides a converter for implementing such methods, which comprises an input signaling bit state analyzing means and a signaling bit storage and conversion means.

9 Claims, 3 Drawing Sheets

METHOD AND AN APPARATUS FOR MUTUALLY CONVERTING DIFFERENT SIGNALING SYSTEMS

BACKGROUND OF THE INVENTION

The present invention generally relates to a method and an apparatus for mutually converting different signaling systems between two transmission devices using the North American Standards (NAS or T1 signals) and the European Conference of Posts Telecommunications Administrations (CEPT or E1 signals) respectively.

Due to the growing application of digital transmission techniques, it is required to establish transmission layers for implementing systematical transmission lines. Studies of international standardization of digital hierarchy systems have been promoted by CCITT etc. from the nineteen seventies.

Recently, internationally recommended digital hierarchy of the CEPT (referred to as E1 signals hereinafter) based on the transmission rate of 2.048 Mb/s and NAS (referred to as T1 signals hereinafter) based on the transmission rate of 1.544 Mb/s are being utilized generally.

Also international interworking hierarchy for digital connection between nations utilizing different digital hierarchy from each other is recommended by CCITT.

Accordingly, an interfacing function of two different signaling systems is required between different digital hierarchies.

Representative examples of these signaling systems are the 1.544 Mb/s signaling systems.

The differences between these two signaling systems are as follows;

In the T1 signals, one multi-frame consists of either 12 frames or 24 frames, with each frame consisting of 1 framing bit and 24 channels, each of which consists of 8 bits. In the multi-frame consisting of 12 frames, the 8th bit of each channel of the 6th and 12th frames of one multi-frame is used as the signaling bit, while in the multi-frame consisting of 24 frames, the 8th bit of each channel of the 6th, 12th, 18th and 24th frames of one multi-frame is used as the signaling bit.

The line signal comprises forward signaling bit (af) transmitted from the outgoing trunk and backward signaling bit (ab) transmitted from the incoming trunk of the exchange, the bit (af) representing hook-off/hook-on states at the calling side, and the bit (ab) representing hook-off/hook-on states at receiving subscriber, or being used as a seizure acknowledge signal at the incoming trunk for the seizure of the trunk.

In the E1 signals, one multi-frame consists of 16 frames, each frame consisting of 32 channels, each of which consists of 8 bits. The 8 bits of channel No. 16 of each frame except 0th frame are used as signaling bits of two channels by 4 bits per one channel. The line signals in this format include forward signaling bits (af, bf) and backward signaling bits (ab, bb), like the T1 signals. Bit of represents hook-off/hook-on states at calling side; the bit bf represents abnormal state at calling side; the bit, ab, represents hook-off/hook-on states at receiving side, and the bit bb represents the state of receiving side.

As described above, when interworking different signaling systems, a converter for mutually converting different signaling systems is connected between the two exchanges using different signaling systems.

FIG. 1 shows the two cases of conversion performed by such a signaling converter. In FIG. 1, E1 exchange (1) performs transmitting/receiving through outgoing trunks (11) and incoming trunks (12). Also, the T1 exchange (3) performs transmitting/receiving in the same manner as the E1 exchange (1), but these exchanges use different signaling systems. Therefore, a converter (2) for mutually converting different signalling systems must be connected between these two exchanges.

(E1 exchange and T1 exchange are referred to as the digital exchange or equivalent of it's digital trunk operating with T1 signal and E1 signal, respectively.)

The description of operation of such a converter is as follows. Firstly, in the case that E1 exchange (1) operates with the outgoing trunks (11) and T1 exchange (3) operates with the incoming trunks (31), forward signaling information (af, bf) of the E1 signals is converted into forward signaling information (af) of the T1 signals in a converter (2) for mutually converting different signaling systems and then transmitted to the incoming trunks (31) of the T1 exchange (3). Whereas backward signaling information (ab) of T1 signals is converted into backward signaling information (ab, bb) of E1 signals in the converter (2) and then transmitted to the incoming trunks (11) of the E1 exchange (1). On the other hand, in the case that the E1 exchange (1) operates with the incoming trunks (12) and the T1 exchange (3) operates with the outgoing trunks (32), the forward signaling information (af) of the T1 signals is converted into the forward signaling information (af, bf) of the E1 signals and then transmitted to the E1 exchange (1); and the backward signaling information (ab, bb) of the E1 signals is converted into the backward signaling information (ab) of the T1 signals and then is transmitted to the T1 exchange (3).

At this time, the two cases of conversion which are shown by dash-line (4), (5), in FIG. 1 are given to each trunk at T1 exchange (3), so that, if trunks of T1 exchange (3) have the type (4), channels of them become incoming channels and channels of trunks at E1 exchange (1) become outgoing channels, whereas if trunks of T1 exchange (3) have the type (5), channels of them become outgoing channels and channels at E1 exchange (3) become incoming channels. Therefore, in accordance with the kinds of signaling method (R2 signaling or loop signaling), signaling conversion functions can be performed separately in the converter (2).

In the present situations, mechanical exchanges such as ST EMD, etc. and electronic exchanges such as M10CN, No. 1A, etc. are utilized as local exchanges, and toll exchanges such as No. 4, AXE-10, etc. are used, too. These exchanges must be interconnected and interworking, always; thus between any two exchanges, as the case may be loop signaling, EMD signaling, or R2 signaling method, etc. are utilized.

Also, loop signaling method or R2 signaling method is utilized in digital trunks, as well as in transmission system using E1 signaling systems to be introduced in the future.

SUMMARY OF THE INVENTION

Accordingly, one object of this invention is to provide an effective and reliable method of mutually converting different signaling systems that interconnect E1 signals and T1 signals; and to provide a method of mutually converting different signalling systems by which signaling conversion functions associated with loop signaling or R2 signaling method can be performed so that the transmission devices utilizing various signaling systems can be interconnected.

Another object of this invention is to provide a converter for implementing such methods.

To achieve the above-mentioned objects, the invention provides a method of mutually converting different signalling systems comprising the steps of;

a first step of determining whether a block consisting of a plurality of channels is in a second interrupted state; a second step of reading the corresponding flag which is set when the first interrupt is occurred due to the transition of signaling bit(s) of that channel and then performing the signaling conversion function in each channel where state transition does not occur when the second interrupt occurs; a third step of determining whether either the block which jumps the second step after being processed in the first step, or the block in which the different signaling conversion function is performed in the second step is in a first interrupted state; a fourth step of detection of the channels in which the transition of signaling bits occurs when the block in the third step is in the first interrupted state, setting the flag of the channel which transition occurs and then storing the new received signaling bits; and a fifth step of either receiving the next block of the block being processed in the third step when the block in the third step is not in the first interrupted state and then returning to the first step, receiving the next block of the block being processed in the fourth step and returning to the first step, or proceeding to an end and when the next block is the last block.

As a means of performing the above-mentioned method, the invention provides a converter for mutually converting different signaling systems comprising, an input signaling bit state analyzing means (10) for receiving the signaling bits of each channel, comparing the newly received signaling bit(s) with a previously received signaling bit(s), and for generating an interrupt to a CPU when the transition of signaling bit(s) occurs; and a signaling bit storage and conversion means (20) connected to the input signaling bit state analyzing means (10) for storing a new signaling bit state inputted from the input signaling bit state analyzing means (10) for converting signaling bit(s) and then transmitting the signaling code of the converted state.

BRIEF DESCRIPTION OF THE DRAWINGS

Now, the invention will be described more in detail by means of examples and with reference to the accompanying drawings, in which.

DETAILED DESCRIPTION OF THE PREFERRED EMBODIMENTS

Figure 2:
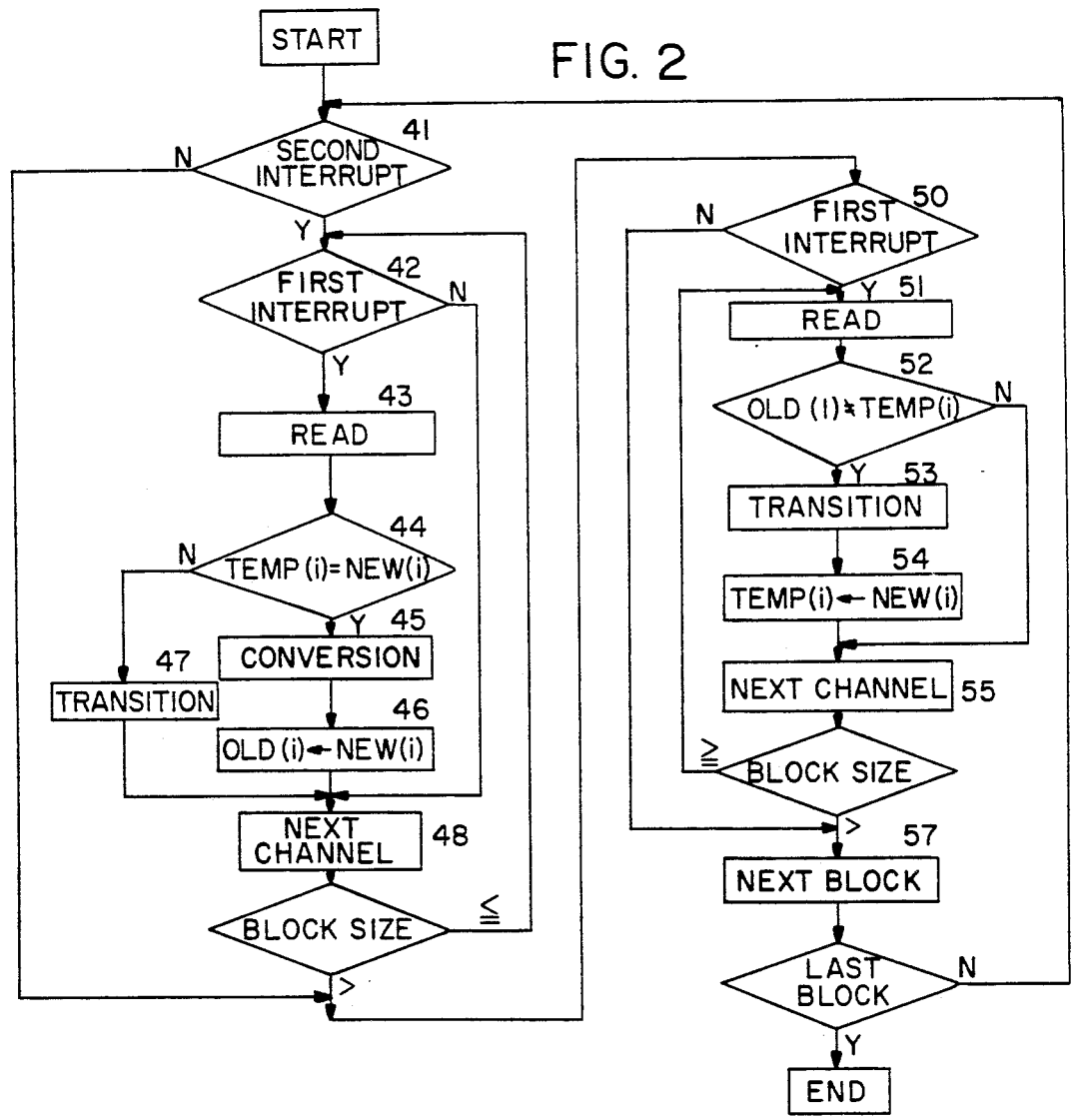
FIG. 2 is the flow chart useful for explaining the signaling conversion method according to the invention.

In FIG. 2, a flow chart useful for explaining the method of converting different signaling systems according to the invention is shown.

In this method, a total of 240 incoming channels form up to 5 T1 trunks and up to 4 E1 trunks in the time division multiplexed bus, reconstructed by 27 blocks, 15 blocks of T1 signals and 12 block of E1 signals, each of which consists of 8 channels in the case of T1 signals or consists of 10 channels in the case of E1 signals. Transition of each signaling channel is monitored block by block.

At this time, when at least one of the signaling bits of one channel in one block is different from that of the signaling bits of the channel in a previous multi-frame, the first interrupt occurs, and after one multi-frame is passed from the time when the first interrupt occurs, the second interrupt occurs automatically by hardware logics.

Thus to prevent the performing of signaling conversion function due to errors occurring in the transmission line, in the method according to the invention, firstly the signaling bits in 3 multi-frames are compared to one another, and then the signaling conversion function is performed only when the firstly received signaling bits are different from the secondly received signaling bits, for which the first interrupt occurs, and the secondly received signaling bits are the same as the thirdly received signaling bits, for which the second interrupt occurs.

To perform such a function, the method according to the invention includes discriminating whether the input block is in the second interrupted state, if the input block is in a second interrupted state, detecting the signaling bits of the channels in this block which need to be converted, performing signaling conversion function for these signaling bits, and discrimination whether the first interrupt occurred for this block.

The method according to the invention further includes the steps of;

A) in the case when the block for which the second interrupt occurred, to find the channel which needs to be converted, monitoring (42) the first channel in the block to find that the first interrupt occurred due to the signaling transition bits of the first channel, and if the first interrupt did not occur in the first channel, monitoring the next channel, and if the first interrupt occurred due to the first channel, reading (43) the new received signaling bit(s) of the channel and monitoring (48) whether this signaling bit(s) is the same as the previous signaling bit(s) [temp(i)], and if so not, determining (47) that the transition of signaling bit in the first interrupt is due to error on the transmission line and monitoring (48) the next channel, and if so, performing (45) signaling conversion function for this channel and after thereafter storing (46) the received signaling bit in an old signaling bit position and then monitoring (48) the next channel.

B) for the blocks which did pass the above-mentioned procedures, or for which the second interrupt did not occur, discrimination (50) of whether the first interrupt did occur, and, if not, monitoring (57) the next block, and, if so, reading (51) the signaling bit(s) of the first channel in the block and monitoring (52) whether the old signaling bit(s) [old (i)] is the same as the new signaling bit(s) [new [i]] and, if so, monitoring the next channel and, if not, declaring (53) that this channel is the channel where transition of signalling bit(s) occurred, and storing (54) a new signaling bit(s) [new (i)] in this channel in temporary signaling bit(s) [temp (i)] position, and then monitoring (55) the next channel, and after replacing (57) the block which passed all the above steps with a new block, returning to the first step of discriminating (41) whether the second interrupt occurred for a new block, and repeating the above steps for all of the remaining blocks. By such procedures, the signaling conversion function is performed effectively and reliably, but not sensitively to errors.

In said cases, the old signaling bit(s) [old(i)] is referred to as the signaling bit(s), which is expected to be received in the current state when no signaling transition occurs. The temporary signaling bit(s) [temp(i)] is referred to as the newly received signaling bit(s), which is stored in temporary position [temp(i)] when the first interrupt occurs. The new signaling bit(s) [new (i)] is referred to as the new received signaling bit(s) which is stored in new position [new (i)] when the second interrupt occurs.

Figure 1:
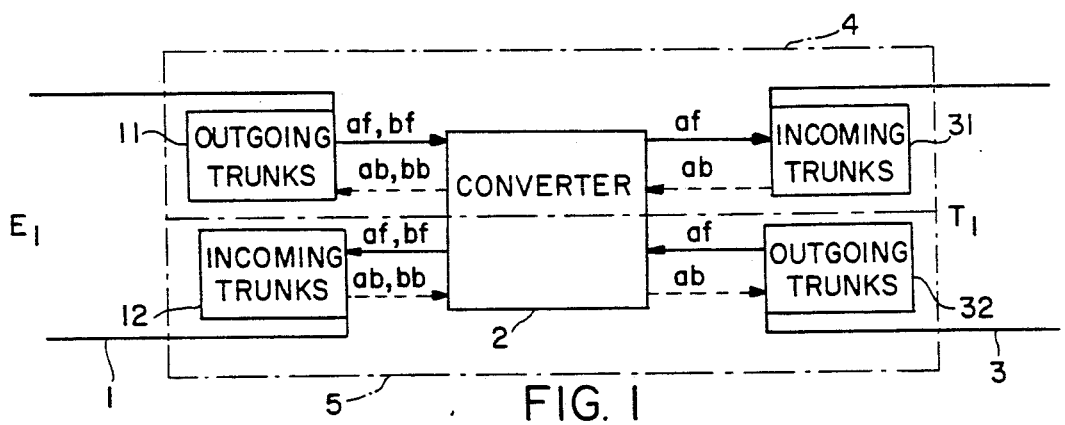
FIG. 1 illustrates the two cases of conversion performed by such a signaling converter.

Also, in the method according to the invention, the signaling conversion function is performed in accordance with the cases (4 or 5) shown in FIG. 1 and whether signalling methods are of either loop signaling method or R2 signaling method. Now, such procedures will be described by way of example.

Figure 3:
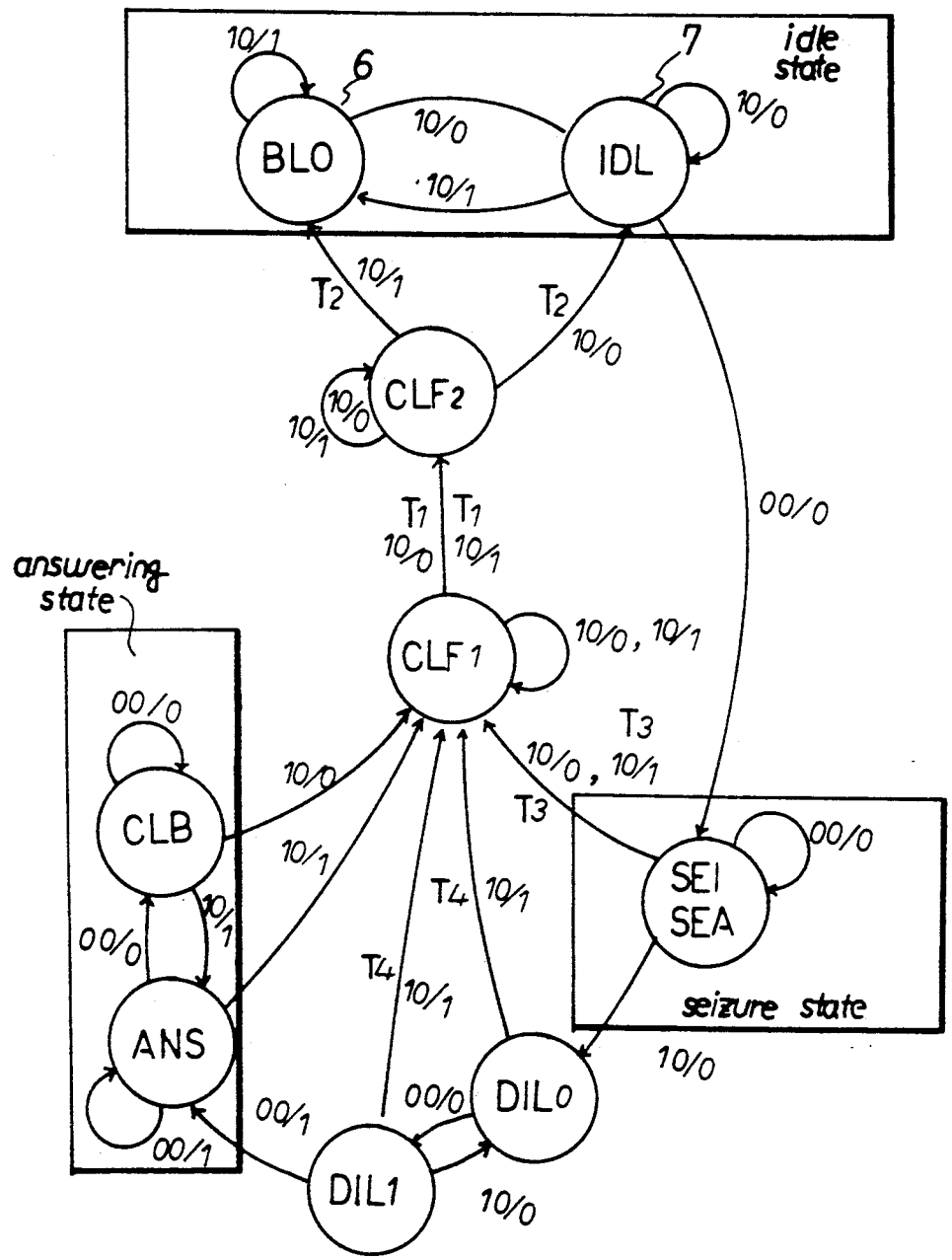
FIG. 3 illustrates transitions of the signaling conversion states.

FIG. 3 shows a table representing conversion state transitions of loop signaling method in the case that the trunks (11) of the E1 exchange (1) operate as outgoing trunks and the trunks (31) of the T1 exchange (3) operate as incoming trunks. In FIG. 3, IDL indicates idle state of the line, SEI indicates seizure state, SEA indicates seizure acknowledge state, DIL indicates dialing state, ANS indicates answering state, CLB indicates clear backward state, CLF indicates clear forward state, and BLO indicates blocking state. Also, T1, T2, T3 and T4 are timers which will be set by time values in each state, and CLF1 and CLF2 indicate transited CLF states. For example, when the transition from blocking state (BLO) (6) to idle state (IDL) (7) occurs, the forward signaling bits, af and bf of E1 signals become "1" and "0", respectively, and the backward signaling bit, ab of T1 signal becomes "0".

At this time, firstly state change table is made in accordance with state transitions of FIG. 3, and then the signaling bits for each state are converted to appropriate signaling bit(s), and then the codes of the signaling bit(s) are output to the signaling channels of the E1 signals and T1 signals.

Table 1 shows the changes of the states in the case that E1 exchange operates with outgoing trunks, and T1 exchange operates with incoming trunks, and when loop signaling method is utilized. Table 2 shows codes of the signaling bits output to the appropriate signaling channels of E1 and T1 signals in such case. At this time, storing the above determined signaling codes to appropriate registers of the transceiver controller of E1 and T1 signals occurs. For example, in the table 1, when current state of the line is idle state, firstly determining whether the current state is to be transited to a new state, that is, seizure state is transited by receiving the forward signaling bits, af and bf, of E1 signals to "0" and "0", respectively, and the backward signaling bit of T1 signals to "0", and then transition of seizure state of the line is accomplished by transmitting the forward signaling bit, af, of T1 signal to "1" and the backward signaling bits, ab and bb, of E1 signals to "1" and "0", respectively, in accordance with the table 2.

Also in the case that E1 exchange operates with incoming trunks and T1 exchange operates with outgoing trunks, or in the case that R2 signaling method is utilized, the signaling conversion function will be performed similarly to the above example. The structure and operation of the signaling converter will be described below.

Figure 4:
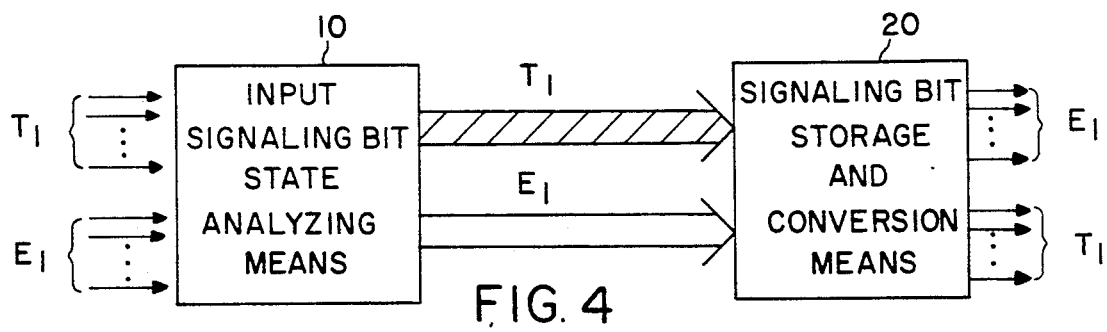
FIG. 4 is a block diagram of a converter according to the invention.

FIG. 4 is a schematic block diagram of the signaling converter according to the invention. The converter according to this invention comprises an input signaling bit(s) state analyzing means (10) for receiving signaling bit(s) of each channel from a plurality of T1 trunks and a plurality of E1 trunks, comparing the newly received signaling bit(s) with the previously received signaling bit(s), and generating an interrupt to a transited channel, and a signaling bit storage and conversion means connected to the input signaling bit state analyzing means (10) for storing signaling bit(s) of each channel, converting the signaling bit(s) and then generating and transmitting converted signaling bits of that channel.

Consequently, the signaling converter converts signaling bits of T1 signals, or signaling bits of E1 signals into signaling bits of E1 signal and signaling bits of T1 signal, respectively.

Figure 5:
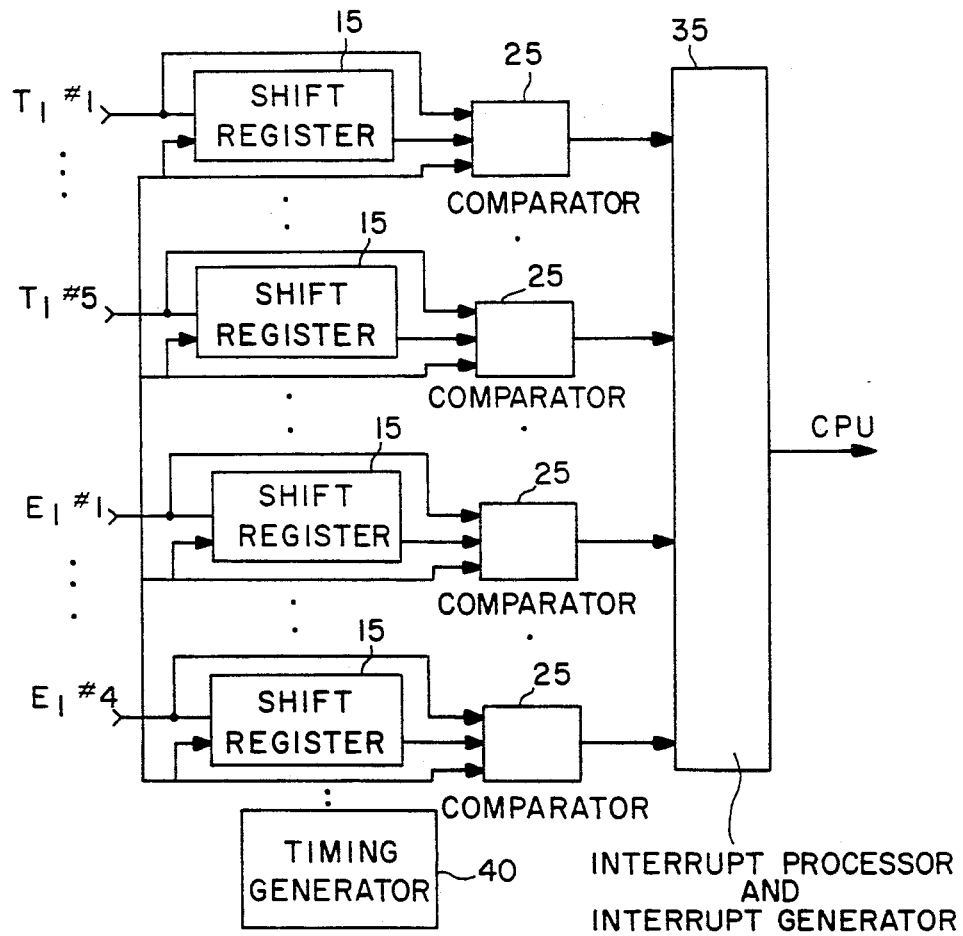
FIG. 5 illustrates an embodiment of an input signaling state analyzing means more in detail.

FIG. 5 illustrates an embodiment of the input signaling bit state analyzing means (10) in detail. This drawing shows a detailed structure of the input signaling bit state analyzing means (10) receiving signaling bits of T1 signals and E1 signals through 5 T1 trunks and 4 E1 trunks.

The input signaling bit state analyzing means (10) includes 128-bit shift registers (15) connected to each trunk, comparators (25) connected to the registers (15), and an interrupt processor and interrupt generator (35) connected to 9 outputs of the comparators (25).

The 128-bit shift registers (15) perform one frame (125 μsec) delay function of signaling bits for each channel, and the comparators (25) compare the received signaling bits with the signaling bits of previous frame. The interrupt processor and interrupt generator an (35) generates interrupt to the CPU and displays what blocks are in an interrupted state.

At this time, when the signaling bits of at least one channel in one block are different from the signaling bits of the channel in one frame before, the interrupt processor and generator (35) generates interrupt to CPU and then, due to the characteristics of state transitions, again generates interrupt to CPU after one multi-frame has passed from that time.

Accordingly, the effects of this invention are as follows.

a) Signaling conversion function is performed effectively and reliably because it is not influenced by errors on transmission lines.

b) The signaling conversion function can be performed for both R2 signaling and loop signaling method and thus the signaling converter according to the invention can be utilized effectively in any region, such as Korea, using E1 signals and T1 signals together with, or in interworking different DS1 signaling systems.

c) Depending on the state of trunks for repair and maintenance of the DS1 trunks, signaling bits for all channels of related trunk can be transmitted as that of the current state, or transmission of blocking code of each channel can be performed, and thus this invention can be utilized in various fields.

d) The signaling conversion function can be implemented by appropriate combinations of hardware and software, and thus this function can be performed effectively without delay.

What is claimed is:

1. A method of mutually converting different signaling systems comprising the steps of:
   a first step of determining whether a block consisting of a plurality of channels is in a second interrupted state;
   a second step of reading a corresponding flag which is set when a first interrupt occurs due to a transition of signaling bit(s) of a channel and then performing a signaling conversion function in each channel where state transition does not occur when a second interrupt occurs;
   a third step of determining whether the block, which jumped the second step after being processed in the first step or on which the different signaling conversion function is performed in the second step, is in a first interrupted state;
   a fourth step of detecting the channels in which the transition of signaling bits occur when the block in the third step is in the first interrupted state, setting the flag of the channel which transition occurs and then storing new received signaling bits; and
   a fifth step of either receiving a next block of the block being processed in the third step when the block in the third step is not in the first interrupted state and then returning to the first step, receiving the next block of the block being processed in the fourth step and returning to the first step, or proceeding to an end when the next block is a last block.

2. The method of claim 1, wherein the blocks are comprised of the channels of 5 T1 trunks and 4 E1 trunks.

3. The method of claim 1, wherein one of the blocks inputted through the plurality of channels is comprised of 8 channels in the T1 signals and 10 channels in the E1 signals.

4. The method of claim 1, wherein the second step comprises:
   a sixth step of comparing a temporary signaling bit(s) of the channel where a transition flag is set with a new received signaling bit, monitoring whether signaling state transition occurred and then monitoring a next channel when signaling state transition occurred; and
   a seventh step of performing the signaling conversion function of the channel, storing a new received signalling bit in an old signalling bit position and then monitoring the next channel when signaling state transition of the previous channel did not occur.

5. The method of claim 4, wherein the fourth step comprises:
   an eighth step of comparing the new received signaling bit(s) of each channel of the block and the old signaling bit(s), monitoring whether signaling state transition occurred and then monitoring the next channel when signal state transition did not occur; and
   a ninth step of setting the signaling state transition flag and storing new received signaling bit(s) into temporary signaling bit(s) storage position when signaling state transition occurs.

6. The method of claim 4, wherein in the second step of detecting the channel which needs to perform the different signaling conversion function, when the old signaling bit(s) inputted previously is the same as the new received signaling bit(s), it is determined that the channel need not perform the signaling conversion function, and when the old signaling bit(s) is different from the new signaling bit(s) and the temporary signaling bit(s) is the same as the new signaling bit(s), it is determined that the channel needs to perform the different signaling conversion function.

7. The method of claim 4, wherein
   the seventh step of performing the different signaling conversion function further comprises:
   where the T1 exchange operates with an outgoing trunk and the E1 exchange operates with an incoming trunk or where the T1 exchange operates with an incoming trunk and the E1 exchange operates with an outgoing trunk; and
   the signaling method respectively comprises either a loop signaling method or a R2 signaling method.

8. A different signaling converter, comprising:
   an input signaling bit state analyzing means (10) for receiving the signaling bits of each channel, comparing a new received signaling bit(s) with a previous received signaling bit(s), and for generating an interrupt to a CPU when a transition of signaling bit(s) occurs; and
   a signaling bit storage and conversion means (20) connected to the input signaling bit state analyzing means (10) for storing a new signaling bit state inputted from the input signaling bit state analyzing means (10), converting signaling bit(s), and transmitting a signaling code of a converted state.

9. The different signaling converter of claim 8, wherein the input signaling bit state analyzing means (10) comprises:
   a plurality of shift registers for delaying a signaling bit(s) inputted through a trunk by one frame;
   a plurality of comparators for comparing the signaling bit(s) which is delayed by a frame against the current signal bit(s);
   an interrupt processor and interrupt generator responsive to a signaling from the comparators for transmitting an interrupt to a CPU and indicating an interrupted block; and
   a timing generator connected to the shift registers and the comparators, respectively, for providing a synchronous timing of each shift register and each comparator.

* * * * *